United States Patent
Weingartz et al.

(10) Patent No.: US 9,273,778 B2
(45) Date of Patent: Mar. 1, 2016

(54) METHOD OF CONTROLLING A TRANSMISSION

(71) Applicant: GM GLOBAL TECHNOLOGY OPERATIONS LLC, Detroit, MI (US)

(72) Inventors: Christopher Jay Weingartz, Holly, MI (US); Matthew D. Whitton, Hartland, MI (US); Xuefeng Tim Tao, Northville, MI (US); Craig J. Hawkins, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 14/448,272

(22) Filed: Jul. 31, 2014

(65) Prior Publication Data

US 2016/0033034 A1 Feb. 4, 2016

(51) Int. Cl.

| | |
|---|---|
| *F16H 61/688* | (2006.01) |
| *F16H 61/04* | (2006.01) |
| *F16H 59/68* | (2006.01) |
| *F16H 59/44* | (2006.01) |
| *F16H 59/38* | (2006.01) |
| *F16H 61/00* | (2006.01) |

(52) U.S. Cl.
CPC .............. *F16H 61/688* (2013.01); *F16H 59/38* (2013.01); *F16H 59/44* (2013.01); *F16H 59/68* (2013.01); *F16H 61/0403* (2013.01); *F16H 2059/6823* (2013.01); *F16H 2061/0087* (2013.01); *F16H 2061/0474* (2013.01)

(58) Field of Classification Search
None
See application file for complete search history.

(56) References Cited

U.S. PATENT DOCUMENTS

| | | | | |
|---|---|---|---|---|
| 4,803,898 | A | * | 2/1989 | Hibino .................... F16H 59/70 477/111 |
| 6,319,168 | B1 | | 11/2001 | Morris et al. |
| 8,359,144 | B2 | | 1/2013 | Morris et al. |
| 8,398,516 | B2 | | 3/2013 | Smith et al. |
| 2006/0155435 | A1 | * | 7/2006 | Dell ........................ F16H 59/70 701/22 |
| 2010/0294058 | A1 | | 11/2010 | Singh et al. |
| 2012/0304960 | A1 | * | 12/2012 | Weaver ................. B60W 10/06 123/325 |
| 2013/0190134 | A1 | * | 7/2013 | Mair ...................... F16H 61/688 477/86 |

* cited by examiner

*Primary Examiner* — Edwin A Young
(74) *Attorney, Agent, or Firm* — Quinn Law Group, PLLC

(57) ABSTRACT

A method of controlling a transmission includes selecting a target speed of a second shaft, and measuring a second speed of the second shaft and an output speed of an output shaft. The method includes detecting a rolling neutral condition wherein a first and second clutch are uncoupled from a torque generator and a synchronizer is mated to a predicted gear to apply a load in a direction, and one of a first condition wherein the output speed is decreasing and the target speed is less than the second speed and a second condition wherein the output speed is increasing and the target speed is less than the second speed. The method then includes translating the synchronizer away from the predicted gear, coupling and decoupling the second clutch to and from the torque generator, and mating the synchronizer to the predicted gear to again apply the load in the direction.

20 Claims, 2 Drawing Sheets

METHOD OF CONTROLLING A TRANSMISSION

TECHNICAL FIELD

The disclosure relates to a method of controlling a transmission.

BACKGROUND

Dual clutch transmissions include two clutches that may be selectively and electronically controlled to transmit torque and provide power to driven wheels of a vehicle. During operation, a first clutch may engage or couple to a torque generator as a second clutch disengages or uncouples from the torque generator so that the dual clutch transmission smoothly shifts from a selected gear to a predicted gear.

As the dual clutch transmission shifts to the predicted gear, meshed components such as gears, synchronizers, and splined input and output shafts interact. Adjacent meshed components generally define a clearance or lash between one another to facilitate assembly of the dual clutch transmission, accommodate thermal expansion, allow for lubrication during operation, and permit deflection of the meshed components under load conditions.

SUMMARY

A method of controlling a transmission is disclosed. The transmission is coupled to a torque generator and has a first clutch connected to a first input shaft and a second clutch connected to a second input shaft. The first clutch is configured for transmitting torque from the torque generator to a selected gear and an output shaft, and the second clutch is configured for transmitting torque from the torque generator to a predicted gear and the output shaft. The transmission further includes a synchronizer matable with the predicted gear. The method includes selecting a target rotational speed of the second input shaft. In addition, the method includes measuring a second rotational speed of the second input shaft and an output rotational speed of the output shaft. Further, the method includes detecting a rolling neutral condition in which: the first clutch and the second clutch are uncoupled from the torque generator such that the first clutch does not transmit torque from the torque generator to the first input shaft, and the second clutch does not transmit torque from the torque generator to the second input shaft; and the synchronizer is mated to the predicted gear such that the synchronizer applies a load to the predicted gear in an initial loading direction. The method also includes detecting one of: a first operating condition in which the output rotational speed is decreasing and the target rotational speed is greater than the second rotational speed, and a second operating condition in which the output rotational speed is increasing and the target rotational speed is less than the second rotational speed. After detecting, the method further includes translating the synchronizer away from the predicted gear such that the synchronizer is spaced apart from the predicted gear. After translating, the method includes coupling the second clutch to the torque generator without transmitting torque to the predicted gear. After coupling, the method includes decoupling the second clutch from the torque generator, and after decoupling, mating the synchronizer to the predicted gear to maintain the initial loading direction.

In one embodiment, the method includes measuring a first rotational speed of the first input shaft. Further, a first ratio of the first rotational speed to the output rotational speed is less than a second ratio of the target rotational speed to the output rotational speed. The method also includes detecting the rolling neutral condition and the first operating condition. After detecting, the method includes translating the synchronizer away from the predicted gear such that the synchronizer is spaced apart from the predicted gear and does not apply the load to the predicted gear. After translating, the method includes coupling the second clutch to the torque generator without transmitting torque to the predicted gear. The method also includes, after coupling, rotationally accelerating the second input shaft so that the second rotational speed is greater than the target rotational speed. After rotationally accelerating, the method includes decoupling the second clutch from the torque generator, and after decoupling, mating the synchronizer to the predicted gear to again apply the load and maintain the initial loading direction. After mating, the method includes re-coupling the second clutch to the torque generator to transmit torque to the predicted gear and the output shaft.

In another embodiment, the first ratio is greater than the second ratio. The method also includes detecting the rolling neutral condition and the second operating condition. After detecting, the method includes translating the synchronizer away from the predicted gear such that the synchronizer is spaced apart from the predicted gear and does not apply the load to the predicted gear. After translating, the method includes coupling the second clutch to the torque generator without transmitting torque to the predicted gear. The method also includes, after coupling, rotationally decelerating the second input shaft so that the second rotational speed is less than the target rotational speed. After rotationally decelerating, the method includes decoupling the second clutch from the torque generator, and after decoupling, mating the synchronizer to the predicted gear to again apply the load and maintain the initial loading direction. After mating, the method includes re-coupling the second clutch to the torque generator to transmit torque to the predicted gear and the output shaft.

As used herein, the terms "a," "an," "the," "at least one," and "one or more" are interchangeable and indicate that at least one of an item is present. A plurality of such items may be present unless the context clearly indicates otherwise. The terms "comprising," "includes," "including," and "has" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
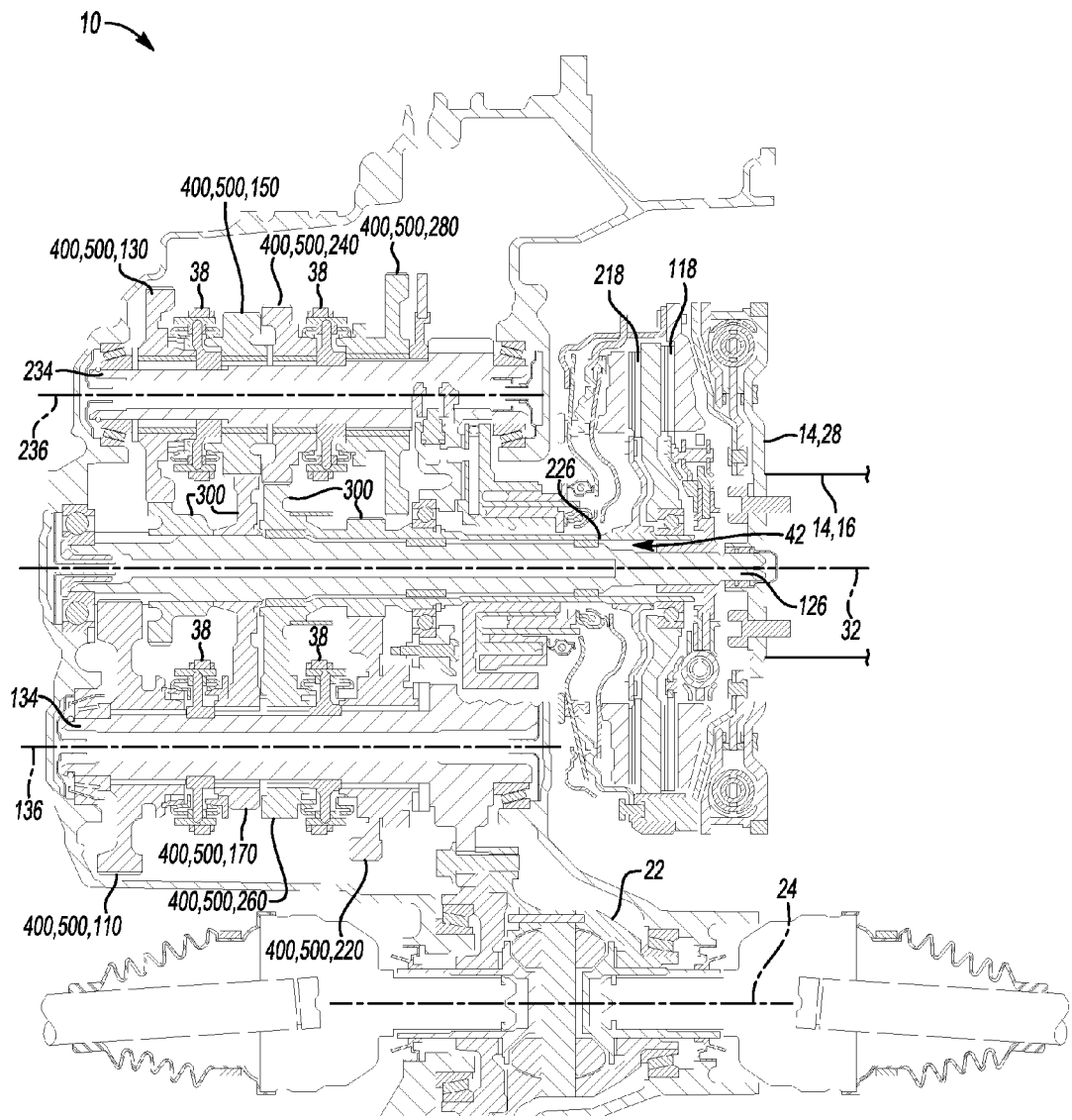
FIG. 1 is a schematic illustration of a cross-sectional fragmentary view of a transmission, wherein the transmission includes a synchronizer matable with a predicted gear.
Figure 2:
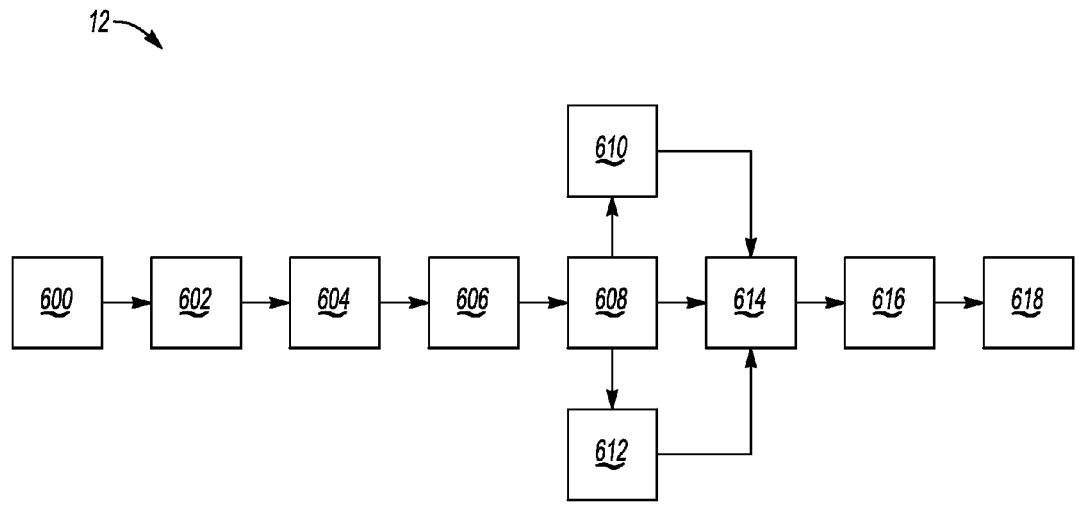
FIG. 2 is a schematic flowchart of a method of controlling the transmission of FIG. 1.

Referring to the Figures, wherein like reference numerals refer to like elements, a transmission 10 is shown generally in FIG. 1 and a method 12 of controlling the transmission 10 is shown generally in FIG. 2. The transmission 10 and method 12 may be useful for automotive applications, such as passenger sedans, sport utility vehicles, or trucks. However, the transmission 10 and method 12 may also be useful for non-automotive applications, such as industrial vehicles or recreational vehicles. The transmission 10 and method 12 may be suitable for vehicles requiring excellent fuel economy, power distribution, and noise abatement. In particular, the method 12 may minimize audible noise as the transmission 10 shifts between a currently selected gear 400 (FIG. 1) and a next predicted gear 500 (FIG. 1) during a rolling neutral condition, as set forth in more detail below.

As described with reference to FIG. 1, the transmission 10 is coupled to, e.g., bolted or otherwise attached to, a torque generator 14. The torque generator 14 may be an internal combustion engine or an electric motor that is capable of generating torque, and may include a transmission input shaft 16 rotatable at an engine speed. Further, the transmission 10 includes two clutches 118, 218, i.e., a first clutch 118 and a second clutch 218. Therefore, the transmission 10 may be described as a dual-clutch transmission or an automated manual transmission. The transmission 10 also includes an output shaft 22 that is rotatable about an output axis 24 and arranged to transmit torque to driven wheels (not shown) of a vehicle. In one non-limiting example, the output shaft 22 may be a differential carrier that is configured for allowing the driven wheels of the vehicle to rotate at different speeds.

The first clutch 118 is connected to a first input shaft 126 and is configured for transmitting torque from the torque generator 14 to a selected gear 400 and the output shaft 22 of the transmission 10. The first clutch 118 may be any suitable clutch. For example, the first clutch 118 may be a wet clutch and may operate under lubrication, or may be a dry clutch which may operate without lubrication. In one non-limiting embodiment, the transmission 10 may be characterized as a dry dual-clutch transmission.

The first clutch 118 may be configured for alternately engaging and disengaging with, i.e., coupling to and uncoupling from, a rotatable component 28, e.g., a flywheel, of the torque generator 14. When the first clutch 118 abuts the rotatable component 28, the first clutch 118 may couple the first input shaft 126 to the rotatable component 28 such that the first input shaft 126 rotates at the same rotational speed as the rotatable component 28. Conversely, when the first clutch 118 is spaced apart from the rotatable component 28, i.e., is not engaged with the rotatable component 28, the first input shaft 126 may be uncoupled from the rotatable component 28 such that the first input shaft 126 does not rotate at the same rotational speed as the rotatable component 28.

The first input shaft 126 may rotate about an input axis 32 that is disposed perpendicular to the rotatable component 28, and may support one or more transfer gears 300 configured for meshing with the selected gear 400 to transmit torque from the rotatable component 28 to the selected gear 400. More specifically, the transmission 10 may also include a first main shaft 134 that is rotatable about a first main axis 136 which is disposed parallel to the input axis 32. The first main shaft 134 may be configured for supporting the selected gear 400 and transmitting torque to the output shaft 22.

The first main shaft 134 may include a plurality of synchronizers 38 each rotatable with and translatable along the first main shaft 134. That is, the plurality of synchronizers 38 may not rotate freely about the first main shaft 134, but may instead be splined to the first main shaft 134 so as to rotate at the same rotational speed as the first main shaft 134 about the first main axis 136. However, each of the plurality of synchronizers 38 may translate along the first main axis 136 to alternately engage and disengage, i.e., select and deselect, the selected gear 400. One of the plurality of synchronizers 38 may be arranged to abut or mate with the selected gear 400 to synchronize or equalize a first rotational speed of the first input shaft 126 and a first main rotational speed of the first main shaft 134 via the selected gear 400. Therefore, when one of the plurality of synchronizers 38 abuts and meshes with the selected gear 400, the transmission 10 may transmit torque from the rotatable component 28 of the torque generator 14 to the first input shaft 126, and from the first input shaft 126 to the selected gear 400, and from the selected gear 400 to the first main shaft 134, and from the first main shaft 134 to the output shaft 22.

The selected gear 400 may represent a currently selected speed of the vehicle or transmission 10 and may be referenced as an engaged gear. That is, the selected gear 400 may be presently engaged such that the transmission 10 may be characterized as operating "in" the selected gear 400. For example, the transmission 10 may be described as a multi-speed transmission, e.g., a 7-speed transmission, and may enable the rotatable component 28 of the torque generator 14 to rotate about the input axis 32 at an optimal speed according to a desired operating condition of the vehicle. For example, the selected gear 400 may be referenced as a first gear 110 and may allow the vehicle to accelerate from a stationary position. Alternately, the selected gear 400 may be referenced as a sixth gear 260 and may allow the vehicle to operate at high speeds. The selected gear 400 may also be described by a gear ratio which defines a ratio of the rotational speed of selected gear 400 to the rotational speed of another gear or shaft.

In one non-limiting example, the first input shaft 126 may be arranged to selectively transmit torque to four gears, i.e., the selected gear 400, 110 and three other gears 130, 150, 170, which may each be characterized as "odd" gears of the transmission 10, e.g., the first gear 110, a third gear 130, a fifth gear 150, and a seventh gear 170.

Similarly, the second clutch 218 is connected to a second input shaft 226 and is configured for transmitting torque from the torque generator 14 to a predicted gear 500 and the output shaft 22 of the transmission 10. The second clutch 218 may be any suitable clutch. For example, the second clutch 218 may be a wet clutch and may operate under lubrication, or may be a dry clutch and may operate without lubrication.

The second clutch 218 may also be configured for alternately engaging and disengaging with, i.e., coupling to and uncoupling from, the rotatable component 28 of the torque generator 14. When the second clutch 218 abuts the rotatable component 28, the second clutch 218 may couple the second input shaft 226 to the rotatable component 28 such that the second input shaft 226 rotates at the same rotational speed as the rotatable component 28. Conversely, when the second clutch 218 is spaced apart from the rotatable component 28, i.e., is not engaged with the rotatable component 28, the second input shaft 226 may be uncoupled from the rotatable component 28 such that the second input shaft 226 does not rotate at the same rotational speed as the rotatable component 28.

The second input shaft 226 may also rotate about the input axis 32, and may support one or more transfer gears 300 configured for meshing with the predicted gear 500 to transmit torque to the predicted gear 500. More specifically, the transmission 10 may also include the second main shaft 234 that is rotatable about the second main axis 236 which is disposed parallel to the input axis 32. The second main shaft 234 may be configured for supporting the predicted gear 500 and transmitting torque to the output shaft 22.

The second main shaft 234 may also include the plurality of synchronizers 38 each rotatable with and translatable along the second main shaft 234. That is, the plurality of synchronizers 38 may not rotate freely about the second main shaft 234, but may instead be splined to the second main shaft 234 so as to rotate at the same rotational speed as the second main shaft 234 about the second main axis 236. However, each of the plurality of synchronizers 38 may translate along the second main axis 236 to alternately engage and disengage, i.e., select and deselect, or mate and be spaced apart from, the predicted gear 500. That is, the transmission 10 may include a plurality of predicted gears 500 each matable with a respective one of the plurality of synchronizers 38.

More specifically, one of the plurality of synchronizers 38 may be arranged to abut or mate to the predicted gear 500 to synchronize or equalize a second rotational speed of the second input shaft 226 and a second main rotational speed of the second main shaft 234 via the predicted gear 500. Therefore, when one of the plurality of synchronizers 38 abuts and mates to the predicted gear 500, the transmission 10 may transmit torque from the rotatable component 28 of the torque generator 14 to the second input shaft 226, and from the second input shaft 226 to the predicted gear 500, and from the predicted gear 500 to the second main shaft 234, and from the second main shaft 234 to the output shaft 22.

As described with reference to FIG. 3, each synchronizer 38 may include a sleeve 138 that is translatable along the first main axis 136 or the second main axis 236 towards the predicted gear 500. Further, the predicted gear 500 may include a plurality of gear teeth 202, and the sleeve 138 may include a plurality of sleeve teeth 140 each matable with the plurality of gear teeth 202. For example, a shift fork (not shown) may move the sleeve 138 into position and translate the synchronizer 38 towards or away from the predicted gear 500.

The synchronizer 38 may also include an inner hub 238, a blocker ring 338, and a strut assembly 438. The strut assembly 438 may be configured for centering the sleeve 138 on the inner hub 238 until the shift fork (not shown) pushes the sleeve 138 along the second main axis 236.

The inner hub 238 may be splined to the second main shaft 234 (FIG. 1) such that the inner hub 238 is held in a stationary position along the second main axis 236. The inner hub 238 may include also include a plurality of external splines 242 configured for mating with the plurality of sleeve teeth 140. Therefore, the sleeve 138 may surround the inner hub 238 and translate back and forth along the external splines 242 of the inner hub 238.

Figure 3:
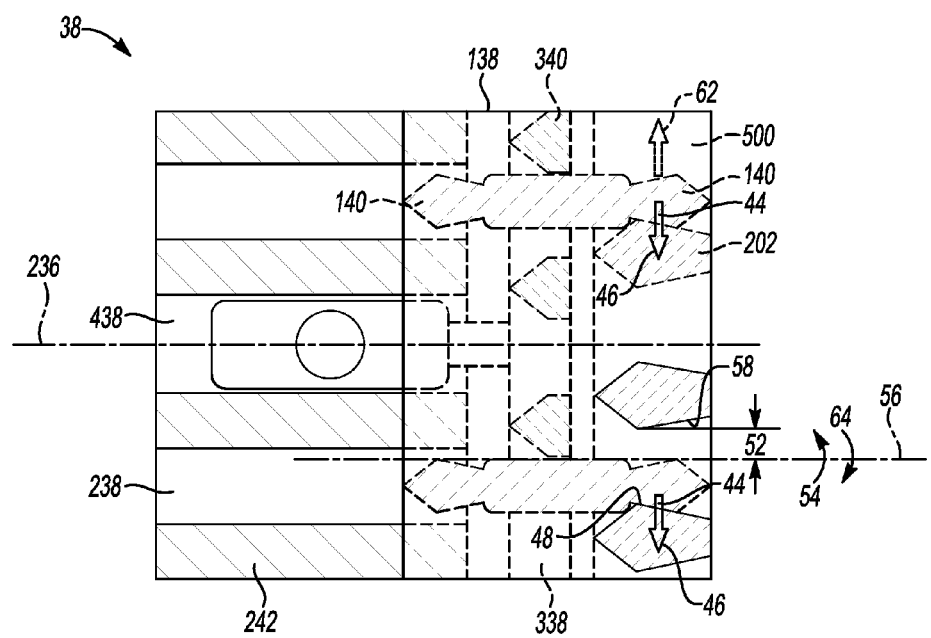
FIG. 3 is a schematic illustration of a top, cross-sectional view of the synchronizer of FIG. 1 mated to the predicted gear.

With continued reference to FIG. 3, the blocker ring 338 may be disposed between, but not attached to, the inner hub 238 and the predicted gear 500. The blocker ring 338 may function as a clutch to speed up or slow down mating components and may include a plurality of ring teeth 340. When the sleeve 138 translates towards the predicted gear 500, the plurality of sleeve teeth 140 may mesh with the plurality of ring teeth 340 and cause the blocker ring 338 to rotate at the same rotational speed as the sleeve 138. As the sleeve 138 continues to translate along the second main axis 236 towards the predicted gear 500, the plurality of sleeve teeth 140 may meshingly engage and abut the plurality of gear teeth 202 to lock the predicted gear 500, the sleeve 138, the inner hub 238, and the second main shaft 234 (FIG. 1) together so that each is rotating at the same rotational speed.

The predicted gear 500 may represent a predicted speed of the vehicle or transmission 10 and may be referenced as a next-to-be-engaged gear. That is, the predicted gear 500 may be an on-coming gear such that the transmission 10 may next shift from the off-going selected gear 400 to the predicted gear 500 based on anticipated vehicle operating conditions. For example, the predicted gear 500 may be referenced as the second gear 220 and may allow the vehicle to accelerate to a higher speed than possible when the selected gear 400 is the first gear 110. Alternately, the predicted gear 500 may be referenced as a seventh gear 170 and may allow the vehicle to operate at high speeds. The predicted gear 500 may also be described by a gear ratio which defines a ratio of the rotational speed of predicted gear 500 to the rotational speed of another gear or shaft.

In one non-limiting example as shown in FIG. 1, the second input shaft 226 may be arranged to selectively transmit torque to four gears, i.e., the predicted gear 500, 220 and three other gears 240, 260, 280, which may each be characterized as "even" gears of the transmission 10, e.g., the second gear 220, a fourth gear 240, the sixth gear 260, and a reverse gear 280.

Although described generally for the arrangement in which the first input shaft 126 transmits torque to the "odd" gears 110, 130, 150, 170 of the transmission 10 and the second input shaft 226 transmits torque to the "even" gears 220, 240, 260, 280 of the transmission 10, it is to be appreciated that the first input shaft 126 may alternatively transmit torque to the "even" gears 220, 240, 260, 280 of the transmission 10 such that the second input shaft 226 transmits torque to the "odd" gears 110, 130, 150, 170 of the transmission 10. That is, the designation "first input shaft 126" refers to the input shaft which supports the transfer gear 300 that is configured to mesh with the selected gear 400, whether or not the selected gear 400 is an "odd" gear 110, 130, 150, 170 or an "even" gear 220, 240, 260, 280. Conversely, the designation "second input shaft 226" refers to the input shaft which supports the transfer gear 300 that is configured to mesh with the predicted gear 500, whether or not the predicted gear 500 is an "odd" gear 110, 130, 150, 170 or an "even" gear 220, 240, 260, 280. Therefore, the selected gear 400 may be an "odd" gear 110, 130, 150, 170 or an "even" gear 220, 240, 260, 280. Likewise, the predicted gear 500 may be an "odd" gear 110, 130, 150, 170 or an "even" gear 220, 240, 260, 280.

Referring again to FIG. 1, the second input shaft 226 may define a cavity 42 therein along the input axis 32, and the first input shaft 126 may be disposed within the cavity 42. That is, the first input shaft 126 and the second input shaft 226 may be coaxial, and the second input shaft 226 may surround at least a portion of the first input shaft 126. Alternatively, although not shown, the first input shaft 126 may define the cavity 42 therein along the input axis 32, and the second input shaft 226 may be disposed within the cavity 42.

Referring now to FIG. 2 and as described with general reference to FIG. 1, the method 12 of controlling the transmission 10 includes selecting 600 a target rotational speed of the second input shaft 226. The target rotational speed may correspond to an anticipated or upcoming driving or vehicle operating condition. More specifically, the target rotational speed may be numerically described as an output rotational speed of the output shaft 22 multiplied by the gear ratio of the predicted gear 500. Selecting 600 may therefore include determining the target rotational speed of the second input shaft 226 that corresponds to the predicted gear 500. For example, the transmission 10 may include a computerized transmission control module (not shown), and the target rotational speed of the second input shaft 226 may be predetermined and stored in and/or accessible by the transmission control module based upon an upcoming driving condition.

In one embodiment, selecting 600 may include predicting a downshift from the selected gear 400 to the predicted gear 500. As used herein, the terminology "downshift" refers to shifting the transmission 10 from the engaged, selected gear 400 described by a comparatively lower gear ratio to the on-coming, predicted gear 500 described by a comparatively higher gear ratio. For example, a downshift of the transmission 10 may describe a condition in which one of the plurality of synchronizers 38 disengages or translates away from selected third gear 400, 130 and another one of the plurality of synchronizers 38 engages or abuts predicted second gear 500, 220.

Alternatively, selecting 600 may include predicting an upshift from the selected gear 400 to the predicted gear 500. As used herein, the terminology "upshift" refers to shifting the transmission 10 from the engaged, selected gear 400 described by a comparatively higher gear ratio to the on-coming, predicted gear 500 described by a comparatively lower gear ratio. For example, an upshift of the transmission 10 may describe a condition in which one of the plurality of synchronizers 38 disengages or translates away from selected third gear 400, 130 and another one of the plurality of synchronizers 38 engages or abuts predicted fourth gear 500, 240.

Referring again to FIG. 2, the method 12 also includes measuring 602 the second rotational speed of the second input shaft 226 and the output rotational speed of the output shaft 22. The method 12 may also include measuring 602 the first rotational speed of the first input shaft 126. As used herein, the terminology "rotational speed" refers to an angular velocity of a component about an axis. Therefore, the first rotational speed refers to the angular speed of rotation of the first input shaft 126 about the input axis 32. Likewise, the second rotational speed refers to the angular speed of rotation of the second input shaft 226 about the input axis 32. Similarly, the output rotational speed refers to the angular speed of rotation of the output shaft 22, e.g., the differential carrier, about the output axis 24.

Measuring 602 may include any suitable manner of ascertaining, recording, and/or storing the first rotational speed, the second rotational speed, and the output rotational speed. For example, the first input shaft 126, the second input shaft 226, and the output shaft 22 may include one or more speed sensors (not shown) configured for measuring 602 and/or transmitting the first rotational speed, the second rotational speed, and the output rotational speed.

Referring again to FIG. 2, the method 12 further includes detecting 604 a) a rolling neutral condition, and b) one of a first operating condition and a second operating condition.

As described with reference to FIG. 1, the method 12 includes detecting 604 a) the rolling neutral condition of the transmission 10 in which the first clutch 118 and the second clutch 218 are uncoupled from the torque generator 14 such that the first clutch 118 does not transmit torque from the torque generator 14 to the first input shaft 126, and the second clutch 218 does not transmit torque from the torque generator 14 to the second input shaft 226. That is, neither the first clutch 118 nor the second clutch 218 abuts or is engaged with the torque generator 14 during the rolling neutral condition. Stated differently, both the first clutch 118 and the second clutch 218 are disengaged during the rolling neutral condition so that the torque generator 14 is disconnected from the transmission 10 such that the transmission 10 may not transmit torque from the rotatable component 28 of the torque generator 14 to the driven wheels of the vehicle. In one non-limiting example, the rolling neutral condition may correspond to a driving or vehicle operating condition in which the vehicle is rolling or coasting downhill.

Further, as described with reference to FIG. 3, for the rolling neutral condition, the synchronizer 38 is also mated to the predicted gear 500 such that the synchronizer 38 applies a load (shown generally by arrow 44) to the predicted gear 500 in an initial loading direction 46. The load 44 may be attributed to a centrifugal force generated by the synchronizer 38 against the predicted gear 500 as the synchronizer 38 and the second main shaft 234 (FIG. 1) rotate together about the second main axis 236. The initial loading direction 46 may, for example, be perpendicular to a first tooth face 48 of the gear tooth 202 of the predicted gear 500.

Therefore, as shown generally in FIG. 3, the synchronizer 38 and the predicted gear 500 may be mated to one another, but may define a lash 52 or clearance therebetween when mated. Such lash 52 may, for example, facilitate assembly of the transmission 10, accommodate thermal expansion, and allow for lubrication during operation of the transmission 10. The lash 52 may be located or disposed in an initial position, e.g., on a first side 54 of a center axis 56 of the predicted gear 500.

Referring again to FIG. 2, the method 12 also includes detecting 604 b) one of the first operating condition and the second operating condition. For the first operating condition, the output rotational speed is decreasing, and the target rotational speed is greater than the second rotational speed. That is, the output rotational speed of the output shaft 22, e.g., the differential carrier, is decelerating or slowing down, and the target rotational speed of the second input shaft 226 is faster than the current second rotational speed of the second input shaft 226. In other words, for the first operating condition, the vehicle and the output shaft 22 are decelerating and the desired next or predicted shift of the transmission 10 requires the second input shaft 226 to accelerate from the second rotational speed to a comparatively faster target rotational speed. As such, the output shaft 22 is decelerating and the second input shaft 226 is required to accelerate to the target rotational speed. Such a first operating condition may occur when the vehicle is decelerating and the transmission 10 is commanded to shift to a lower predicted gear 500, i.e., a predicted gear 500 described by a comparatively higher gear ratio than the gear ratio of the currently selected gear 400.

By comparison, for the second operating condition, the output rotational speed is increasing, and the target rotational speed is less than the second rotational speed. That is, the output rotational speed of the output shaft 22, e.g., the differential carrier, is accelerating or speeding up, and the target rotational speed of the second input shaft 226 is slower than the current second rotational speed of the second input shaft 226. In other words, for the second operating condition, the vehicle and the output shaft 22 are accelerating and the desired next or predicted shift of the transmission 10 requires the second input shaft 226 to decelerate from the second rotational speed to a comparatively slower target rotational speed. As such, the output shaft 22 is accelerating and the second input shaft 226 is required to decelerate to the target rotational speed. Such a second operating condition may occur when the vehicle is accelerating and the transmission 10 is commanded to shift to a higher predicted gear 500, i.e., a predicted gear 500 described by a comparatively lower gear ratio than the gear ratio of the currently selected gear 400.

Therefore, for the method 12, detecting 604 may also include determining that the transmission 10 is not subject to the first operating condition and the second operating condition, even if the transmission 10 is operating under the rolling neutral condition. That is, detecting 604 may include determining whether the output shaft 22 and the second input shaft 226 are both rotationally decelerating such that the transmission 10 is not operating under the first operating condition or the second operating condition. Conversely, detecting 604 may include determining whether the output shaft 22 and the second input shaft 226 are both rotationally accelerating such that the transmission 10 is not operating under the first operating condition or the second operating condition. That is, the method 12 detects a driving or vehicle operating condition in which both the first clutch 118 and the second clutch 218 are disengaged from or not coupled to the torque generator 14 and the second input shaft 226 and the output shaft 22 are about to start accelerating in different directions. In other words, the method 12 detects that the second input shaft 226 is required to accelerate to reach the target rotational speed for the predicted gear 500 while the output shaft 22 is decelerating, or that the second input shaft 226 is required to decelerate to reach the target rotational speed for the predicted gear 500 while the output shaft 22 is accelerating.

Referring to FIG. 3, when the output shaft 22 and the second input shaft 226 are not both accelerating or not both decelerating, and a shift to the predicted gear 500 requires that the second rotational speed and the output rotational speed become synchronized to one another so that the transmission 10 can transfer torque from the second input shaft 226 to the output shaft 22 by way of the predicted gear 500, the load 44 may be applied against the second tooth face 58 that is opposite the first tooth face 48 in a secondary loading direction (shown generally as dashed arrow 62 in FIG. 3). That is, as the synchronizer 38 attempts to engage the predicted gear 500 while one of the output shaft 22 and the second input shaft 226 is decelerating while the other is accelerating, the load 44 may "switch sides" across the center axis 56.

Consequently, during the first operating condition and the second operating condition, the lash 52 defined between the synchronizer 38 and the predicted gear 500 may contribute to a change in the relative positions of the synchronizer 38 and the predicted gear 500. That is, the synchronizer 38 and the lash 52 may change locations, e.g., relocate or shift from the initial position to a secondary position, e.g., on a second side 64 of the center axis 56 of the predicted gear 500. Such position or location reversal may result in audible noise, e.g., a grinding or clashing sound. However, the method 12 mitigates such lash position reversal and resulting audible noise by detecting 604 (FIG. 2) the first operating condition in which a shift to the next predicted gear 500 requires that the output shaft 22 and the second input shaft 226 decelerate and accelerate, respectively, or the second operating condition in which the shift to the next predicted gear 500 requires that the output shaft 22 and the second input shaft 226 accelerate and decelerate, respectively.

In particular, to prevent the load 44 from shifting from the initial loading direction 46 to the secondary loading direction 62, after detecting 604 a) the rolling neutral condition and b) one of the first operating condition and the second operating condition, the method 12 includes translating 606 (FIG. 2) the synchronizer 38 away from the predicted gear 500 such that the synchronizer 38 is spaced apart from the predicted gear 500 and does not apply the load 44 to the predicted gear 500. That is, the method 12 includes disengaging the synchronizer 38 that was previously mated to the predicted gear 500 during the rolling neutral condition. After the synchronizer 38 moves away from the predicted gear 500 along the second main axis 236, i.e., disengages from the predicted gear 500 so that the predicted gear 500 no longer meshes or mates with the synchronizer 38, the predicted gear 500 may rotate freely about the second main shaft 234. Therefore, translating 606 uncouples the predicted gear 500 from the second main shaft 234. For embodiments including the plurality of predicted gears 500, translating 606 may include spacing each of the plurality of synchronizers 38 apart from each of the plurality of predicted gears 500 and the selected gear 400 such that each of the plurality of synchronizers 38 is not mated to any of the plurality of predicted gears 500 and the selected gear 400. That is, the method 12 may include disengaging all of the synchronizers 38 of the second main shaft 234 so that the second main shaft 234 may rotate independently of the first input shaft 126 and/or the second input shaft 226. In other words, translating 606 may include commanding the second main shaft 234 to a neutral state.

Recalling now that before translating 606, the method 12 includes detecting 604 a) the rolling neutral condition in which the first clutch 118 and the second clutch 218 are uncoupled from the torque generator 14 so that no torque is transmitted from the torque generator 14 to the first input shaft 126 and the second input shaft 226, after translating 606, the method 12 includes coupling 608 (FIG. 2) the second clutch 218 to the torque generator 14 without transmitting torque to the predicted gear 500. That is, the method 12 includes engaging the second clutch 218 so that the torque generator 14 is coupled to the second input shaft 226. However, since the synchronizer 38 is spaced apart from the predicted gear 500 after translating 606, no torque is transmitted to the predicted gear 500. Consequently, no torque is transmitted between the second input shaft 226 and the second main shaft 234.

Such coupling 608 equalizes the engine speed at which the transmission input shaft 16 (FIG. 1) rotates and the second rotational speed at which the second input shaft 226 rotates. That is, coupling 608 ensures that the transmission input shaft 16 and the second input shaft 226 rotate about the input axis 32 at the same rotational speed.

Therefore, the method 12 may be suitable for driving conditions in which the vehicle and the output shaft 22, e.g., the differential carrier, are decelerating or slowing down and the transmission 10 is commanded to downshift to a lower predicted gear 500, i.e., wherein a first ratio of the first rotational speed to the output rotational speed is less than a second ratio of the target rotational speed to the output rotational speed. For example, the output shaft 22 may be decelerating and the transmission 10 may be required to shift between a higher selected gear 400, e.g., third gear 130, to a lower predicted gear 500, e.g., second gear 220.

As such, for this embodiment, the method 12 includes, after coupling 608, rotationally accelerating 610 (FIG. 2) the second input shaft 226 so that the second rotational speed is greater than the target rotational speed. That is, the method 12 may include increasing the engine speed at which the transmission input shaft 16 rotates so that the second rotational speed of the second input shaft 226 is also increased to greater than the target rotational speed. For example, the transmission control module (not shown) may transmit an engine speed request signal to a sensor (not shown) to ascertain the engine speed, and then command the engine speed to increase. Since the second clutch 218 is engaged and the second input shaft 226 is coupled to the transmission input shaft 16, the second rotational speed of the second input shaft 226 consequently also increases to faster than the target rotational speed. Stated differently, in this embodiment, the second input shaft 226 must eventually slow down to reach the target rotational speed.

Conversely, the method 12 may be suitable for driving conditions in which the vehicle and the output shaft 22, e.g., the differential carrier, are accelerating or speeding up and the transmission 10 is commanded to upshift to a higher predicted gear 500, i.e., wherein a first ratio of the first rotational speed to the output rotational speed is greater than a second ratio of the target rotational speed to the output rotational speed. For example, the output shaft 22 may be accelerating and the transmission 10 may be required to shift between a lower selected gear 400, e.g., first gear 110, to a higher predicted gear 500, e.g., second gear 220.

As such, for this embodiment, the method 12 includes, after coupling 608, rotationally decelerating 612 the second input shaft 226 so that the second rotational speed is less than the target rotational speed. That is, the method 12 may include decreasing the engine speed at which the transmission input shaft 16 rotates so that the second rotational speed of the second input shaft 226 is also decreased to less than the target rotational speed. For example, the transmission control module (not shown) may transmit an engine speed request signal to a sensor (not shown) to ascertain the engine speed, and then command the engine speed to decrease. Since the second clutch 218 is engaged and the second input shaft 226 is coupled to the transmission input shaft 16, the second rotational speed of the second input shaft 226 consequently also decreases to slower than the target rotational speed. Stated differently, in this embodiment, the second input shaft 226 must eventually speed up to reach the target rotational speed.

Referring again to FIG. 2, the method 12 also includes, after coupling 608, decoupling 614 the second clutch 218 from the torque generator 14. That is, decoupling 614 may disengage the second clutch 218 so that the torque generator 14 does not transmit torque from the rotational component 28 to the second input shaft 226. However, as set forth above, after coupling 608 and prior to decoupling 614, the method 12 may further include increasing the engine speed to greater than the target rotational speed. Conversely, after coupling 608 and prior to decoupling 614, the method 12 may further include decreasing the engine speed to less than the target rotational speed.

Decoupling 614 may include determining one of a first state, a second state, a third state, and a fourth state so as to ascertain whether the second input shaft 226 and the output shaft 22 are both rotationally accelerating or both rotationally decelerating, depending on the selected gear 400 and the next predicted gear 500.

For example, decoupling 614 may include determining the first state in which the second rotational speed is greater than the output rotational speed, and the second input shaft 226 and the output shaft 22 are both rotationally decelerating. Conversely, decoupling 614 may include determining the second state in which the second rotational speed is less than the output rotational speed, and the second input shaft 226 and the output shaft 22 are both rotationally accelerating. Decoupling 614 may include determining the third state in which the second rotational speed is less than the output rotational speed, and the second input shaft 226 and the output shaft 22 are both rotationally decelerating. Alternatively, decoupling 614 may include determining the fourth state in which the second rotational speed is greater than the output rotational speed, and the second input shaft 226 and the output shaft 22 are both rotationally accelerating.

Stated differently, once the first state or the second state or the third state or the fourth state occurs, the method 12 includes decoupling 614 the second clutch 218 from the torque generator 14 so that the second input shaft 226 is also uncoupled from the torque generator 14. That is, once the second input shaft 226 and the output shaft 22 are both rotationally accelerating or both rotationally decelerating, the method 12 includes decoupling 614 the second clutch 218 from the torque generator 14.

Therefore, for the embodiment in which the output shaft 22 is decelerating and the transmission 10 is required to downshift to a lower predicted gear 500, e.g., wherein the selected gear 400 is third gear 130 and the predicted gear 500 is second gear 220 and the vehicle is decelerating, the method 12 includes, after rotationally accelerating 610 the second input shaft 226 so that the second rotational speed is faster than the target rotational speed, decoupling 614 the second clutch 218 from the torque generator 14.

Similarly, for the embodiment in which the output shaft 22 is accelerating and the transmission 10 is required to upshift to a higher predicted gear 500, e.g., when the selected gear 400 is first gear 110 and the predicted gear 500 is second gear 220 and the vehicle is accelerating, the method 12 includes, after rotationally decelerating 612 the second input shaft 226 so that the second rotational speed is slower than the target rotational speed, decoupling 614 the second clutch 218 from the torque generator 14.

Referring again to FIG. 2, the method 12 also includes, after decoupling 614, mating 616 the synchronizer 38 to the predicted gear 500 to again apply the load 44 (FIG. 3) in the initial loading direction 46 (FIG. 3). That is, as described with reference to FIG. 3, the method 12 includes mating 616 the synchronizer 38 to the predicted gear 500 to apply the load 44 to the first tooth face 48 and maintain the initial loading direction 46 so that the load 44 is not applied to the second tooth face 58 in the secondary loading direction 62. In particular, mating 616 may include moving the synchronizer 38 along the second main axis 236 into contact or meshing engagement with the predicted gear 500 so that an initial position of the synchronizer 38 and the lash 52 does not change across the center axis 56 of the predicted gear 500.

Such mating 616 therefore may include synchronizing the output rotational speed and the second rotational speed as the output shaft 22 and the second input shaft 226 both rotationally accelerate to maintain the initial loading direction 46 (FIG. 3) such that the initial loading direction 46 is not reversed. Likewise, mating 616 may conversely include synchronizing the output rotational speed and the second rotational speed as the output shaft 22 and the second input shaft 226 both rotationally decelerate to maintain the initial loading direction 46 such that the initial loading direction 46 is not reversed.

In other words, mating 616 may include moving the synchronizer 38 towards the predicted gear 500 along the second input shaft 226 as the synchronizer 38 and the predicted gear 500 accelerate at different magnitudes in the same direction. That is, since acceleration is defined at a rate at which an object changes speed and is a vector, during mating 616, the synchronizer 38 and the predicted gear 500 may both accelerate at different rates, i.e., magnitudes, but may both accelerate in the same direction. Conversely, mating 616 may include moving the synchronizer 38 towards the predicted gear 500 along the second input shaft 226 as the synchronizer 38 and the predicted gear 500 decelerate at different magnitudes in the same direction.

Referring again to the method 12 of FIG. 2 as described with reference to FIG. 1, the method 12 may further include, after mating 616, re-coupling 618 the second clutch 218 to the torque generator 14 to transmit torque to the predicted gear 500 and the output shaft 22. That is, once the synchronizer 38 again meshingly engages or mates to the predicted gear 500, the transmission 10 is prepared to transmit torque to the second main shaft 234 and to the output shaft 22 via the predicted gear 500. Therefore, the method 12 may include re-coupling 618 the second clutch 218 to the torque generator 14 to once again couple the torque generator 14 and the second input shaft 226. As such, after re-coupling 618, the transmission 10 may transmit torque from the second input shaft 226 to the predicted gear 500, from the predicted gear 500 to the second main shaft 234, and from the second main shaft 234 to the output shaft 22.

Accordingly, the method 12 may be suitable for controlling the transmission 10 as a vehicle operates in the rolling neutral condition, i.e., in which both the first clutch 118 and the second clutch 218 are disengaged or uncoupled from the torque generator 14, and the second input shaft 226 is required to either accelerate from the second rotational speed to the target rotational speed when the output shaft 22 is decelerating, or decelerate from the second rotational speed to the target rotational speed when the output shaft 22 is accelerating.

In summary, when the transmission 10 operates in the rolling neutral condition, if the second input shaft 226 is not already rotationally coupled to the appropriate predicted gear 500, the second main shaft 234 is commanded to the neutral state, e.g., via the transmission control module (not shown), by disengaging each of the plurality of synchronizers 38 on the second main shaft 234 so that any predicted gears 500 may rotate freely about the second main shaft 234. If the second main shaft 234 is already in the neutral state, the second main shaft 234 is kept in the neutral state until the synchronizer 38 has a desired slip direction.

For example, the synchronizer 38 may have a positive slip direction if driving or vehicle operating conditions require that the second input shaft 226 must rotate faster or accelerate to eventually have a second rotational speed that is larger than the target rotational speed. Conversely, the synchronizer 38 may have a negative slip direction if driving or vehicle operating conditions require that the second input shaft 226 must rotate slower or decelerate to eventually have a second rotational speed that is less than the target rotational speed.

Further, when the second main shaft 234 is overridden or commanded to the neutral state, the transmission control module may command the second clutch 218 to engage so that the second input shaft 226 rotates at the engine speed. Optionally, the transmission control module may increase or decrease the engine speed while the second clutch 218 is coupled to the torque generator 14 so that the second rotational speed of the second input shaft 226 also increases or decreases. However, it is to be appreciated that the engine speed may not be required to increase or decrease if the second rotational speed is already greater or less than the output rotational speed.

Then, once both the second input shaft 226 and the output shaft 22 are both rotationally accelerating or both rotationally decelerating, the transmission control module may command the second clutch 218 to disengage or uncouple from the torque generator 14. Subsequently, the synchronizer 38 mates to the predicted gear 500 and the second clutch 218 re-couples to the torque generator 14 to thereby transmit torque to the output shaft 22 via the second input shaft 226, the predicted gear 500, and the second main shaft 234.

For conditions in which the transmission 10 is operating under the rolling neutral condition and the output shaft 22 is decelerating while the transmission 10 requires a downshift to the predicted gear 500, the method 12 ensures that the second input shaft 226 first rotates faster than the output shaft 22 and then decelerates before the synchronizer 38 is engaged and mates to the predicted gear 500. In this circumstance, the synchronizer 38 may not mate to the predicted gear 500 until both the second input shaft 226 and the output shaft 22 are rotationally decelerating.

Conversely, for conditions in which the transmission 10 is operating under the rolling neutral condition and the output shaft 22 is accelerating while the transmission 10 requires an upshift to the predicted gear 500, the method 12 ensures that the second input shaft 226 first rotates slower than the output shaft 22 and then accelerates before the synchronizer 38 is engaged and mates to the predicted gear 500. In this circumstance, the synchronizer 38 may not mate to the predicted gear 500 until both the second input shaft 226 and the output shaft 22 are rotationally accelerating.

Therefore, the method 12 mitigates potential audible noise caused by synchronizing the second rotational speed of the second input shaft 226 and the output rotational speed of the output shaft 22 via the predicted gear 500 for conditions in which the second input shaft 226 and the output shaft 22 are not both accelerating or both decelerating. Referring to FIG. 3, since such circumstances may cause the load 44 to switch from the first tooth face 48 as applied in the initial loading direction 46 to the second tooth face 58 as applied in the secondary loading direction 62, a location of the lash 52 defined between the synchronizer 38 and the predicted gear 500 may translate across the center axis 56.

However, the method 12 ensures that the load 44 is only applied in the initial loading direction 46, and not in the secondary loading direction 62, even as the vehicle enters the rolling neutral condition and the transmission 10 is required to downshift while the vehicle is decelerating or upshift while the vehicle is accelerating. Advantageously, the method 12 determines an appropriate moment to engage or mate the synchronizer 38 to the predicted gear 500 after a) the rolling neutral condition and b) one of the first operating condition and the second operating condition is detected to minimize driveline disturbances and audible noise.

That is, by first disengaging the synchronizer 38, i.e., translating 606 the synchronizer 38 away from the predicted gear 500, then coupling 608 the second clutch to the torque generator 14 to change the second rotational speed of the second input shaft 226 based on the target rotational speed, then decoupling 614 the second clutch 218, and then again mating the synchronizer 38 to the predicted gear 500, the method 12 uses the engine speed to appropriately change the second rotational speed of the second input shaft 226. The method 12 changes the second rotational speed according to whether the output shaft 22 is accelerating or decelerating so that the synchronizer 38 does not attempt to mate with the predicted gear 500 while the second input shaft 226 and the output shaft 22 are not both rotationally accelerating or not both rotationally decelerating.

Therefore, the method 12 may be useful for controlling a dual clutch transmission or an automated manual transmission which includes at least two clutches 118, 218 and at least one synchronizer 38. Further, the method 12 may be useful for synchronizing or equalizing the rotational speed of two rotating shafts, e.g., the second input shaft 226 and the output shaft 22 and minimizing audible noise produced by the transmission 10.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of controlling a transmission, wherein the transmission is coupled to a torque generator and has a first clutch connected to a first input shaft and configured for transmitting torque from the torque generator to a selected gear and an output shaft, a second clutch connected to a second input shaft and configured for transmitting torque from the torque generator to a predicted gear and the output shaft, and a synchronizer matable with the predicted gear, the method comprising:

selecting a target rotational speed of the second input shaft;
measuring a second rotational speed of the second input shaft and an output rotational speed of the output shaft;
detecting:
- a rolling neutral condition in which:
  - the first clutch and the second clutch are uncoupled from the torque generator such that the first clutch does not transmit torque from the torque generator to the first input shaft, and the second clutch does not transmit torque from the torque generator to the second input shaft; and
  - the synchronizer is mated to the predicted gear such that the synchronizer applies a load to the predicted gear in an initial loading direction; and
- one of:
  - a first operating condition in which the output rotational speed is decreasing and the target rotational speed is greater than the second rotational speed; and
  - a second operating condition in which the output rotational speed is increasing and the target rotational speed is less than the second rotational speed;
after detecting, translating the synchronizer away from the predicted gear such that the synchronizer is spaced apart from the predicted gear;
after translating, coupling the second clutch to the torque generator without transmitting torque to the predicted gear;
after coupling, decoupling the second clutch from the torque generator; and
after decoupling, mating the synchronizer to the predicted gear to again apply the load in the initial loading direction.

2. The method of claim 1, further including, after mating, re-coupling the second clutch to the torque generator to transmit torque to the predicted gear and the output shaft.

3. The method of claim 1, wherein selecting includes predicting a downshift from the selected gear to the predicted gear.

4. The method of claim 3, wherein detecting includes determining whether the output shaft and the second input shaft are both rotationally decelerating.

5. The method of claim 1, wherein selecting includes predicting an upshift from the selected gear to the predicted gear.

6. The method of claim 5, wherein detecting includes determining whether the output shaft and the second input shaft are both rotationally accelerating.

7. The method of claim 1, wherein the transmission includes:
- a plurality of synchronizers each rotatable with and translatable along the second input shaft; and
- a plurality of predicted gears each matable with one of the plurality of synchronizers; and
- further wherein translating includes spacing each of the plurality of synchronizers apart from each of the plurality of predicted gears and the selected gear such that each of the plurality of synchronizers is not mated to any of the plurality of predicted gears and the selected gear.

8. The method of claim 1, wherein mating includes synchronizing the output rotational speed and the second rotational speed as the output shaft and the second input shaft both rotationally accelerate to maintain the initial loading direction.

9. The method of claim 1, wherein mating includes synchronizing the output rotational speed and the second rotational speed as the output shaft and the second input shaft both rotationally decelerate to maintain the initial loading direction.

10. The method of claim 1, wherein the torque generator includes a transmission input shaft rotatable at an engine speed, and further including, after coupling and prior to decoupling, increasing the engine speed to greater than the target rotational speed.

11. The method of claim 1, wherein the torque generator includes a transmission input shaft rotatable at an engine speed, and further including, after coupling and prior to decoupling, decreasing the engine speed to less than the target rotational speed.

12. The method of claim 1, wherein decoupling includes determining one of:
- a first state in which the second rotational speed is greater than the output rotational speed, and the second input shaft and the output shaft are both rotationally decelerating; and
- a second state in which the second rotational speed is less than the output rotational speed, and the second input shaft and the output shaft are both rotationally accelerating.

13. A method of controlling a transmission, wherein the transmission is coupled to a torque generator and has a first clutch connected to a first input shaft and configured for transmitting torque from the torque generator to a selected gear and an output shaft, a second clutch connected to a second input shaft and configured for transmitting torque from the torque generator to a predicted gear and the output shaft, and a synchronizer matable with the predicted gear, the method comprising:
selecting a target rotational speed of the second input shaft;
measuring a first rotational speed of the first input shaft, a second rotational speed of the second input shaft, and an output rotational speed of the output shaft;
wherein a first ratio of the first rotational speed to the output rotational speed is less than a second ratio of the target rotational speed to the output rotational speed;
detecting:
- a rolling neutral condition in which:
  - the first clutch and the second clutch are uncoupled from the torque generator such that the first clutch does not transmit torque from the torque generator to the first input shaft, and the second clutch does not transmit torque from the torque generator to the second input shaft; and
  - the synchronizer is mated to the predicted gear such that the synchronizer applies a load to the predicted gear in an initial loading direction; and
- a first operating condition in which the output shaft is rotationally decelerating and the target rotational speed is greater than the second rotational speed;
after detecting, translating the synchronizer away from the predicted gear such that the synchronizer is spaced apart from the predicted gear and does not apply the load to the predicted gear;
after translating, coupling the second clutch to the torque generator without transmitting torque to the predicted gear;
after coupling, rotationally accelerating the second input shaft so that the second rotational speed is greater than the target rotational speed;
after rotationally accelerating, decoupling the second clutch from the torque generator;

after decoupling, mating the synchronizer to the predicted gear to again apply the load and maintain the initial loading direction; and after mating, re-coupling the second clutch to the torque generator to transmit torque to the predicted gear and the output shaft.

14. The method of claim 13, wherein mating includes synchronizing the output rotational speed and the second rotational speed as the output shaft and the second input shaft both rotationally accelerate to maintain the initial loading direction.

15. The method of claim 13, wherein decoupling includes determining one of:
- a second state in which the second rotational speed is less than the output rotational speed, and the second input shaft and the output shaft are both rotationally accelerating; and
- a fourth state in which the second rotational speed is greater than the output rotational speed, and the second input shaft and the output shaft are both rotationally accelerating.

16. The method of claim 13, wherein mating includes moving the synchronizer towards the predicted gear along the second input shaft as the synchronizer and the predicted gear accelerate at different magnitudes in the same direction.

17. A method of controlling a transmission, wherein the transmission is coupled to a torque generator and has a first clutch connected to a first input shaft and configured for transmitting torque from the torque generator to a selected gear and an output shaft, a second clutch connected to a second input shaft and configured for transmitting torque from the torque generator to a predicted gear and the output shaft, and a synchronizer matable with the predicted gear, the method comprising:
- selecting a target rotational speed of the second input shaft;
- measuring a first rotational speed of the first input shaft, a second rotational speed of the second input shaft, and an output rotational speed of the output shaft;
- wherein a first ratio of the first rotational speed to the output rotational speed is greater than a second ratio of the target rotational speed to the output rotational speed;
- detecting:
  - a rolling neutral condition in which:
    - the first clutch and the second clutch are uncoupled from the torque generator such that the first clutch does not transmit torque from the torque generator to the first input shaft, and the second clutch does not transmit torque from the torque generator to the second input shaft; and
    - the synchronizer is mated to the predicted gear such that the synchronizer applies a load to the predicted gear in an initial loading direction; and
  - a second operating condition in which the output shaft is rotationally accelerating and the target rotational speed is less than the second rotational speed;
- after detecting, translating the synchronizer away from the predicted gear such that the synchronizer is spaced apart from the predicted gear and does not apply the load to the predicted gear;
- after translating, coupling the second clutch to the torque generator without transmitting torque to the predicted gear;
- after coupling, rotationally decelerating the second input shaft so that the second rotational speed is less than the target rotational speed;
- after rotationally decelerating, decoupling the second clutch from the torque generator;
- after decoupling, mating the synchronizer to the predicted gear to again apply the load and maintain the initial loading direction; and
- after mating, re-coupling the second clutch to the torque generator to transmit torque to the predicted gear and the output shaft.

18. The method of claim 17, wherein mating includes synchronizing the output rotational speed and the second rotational speed as the output shaft and the second input shaft both rotationally decelerate to maintain the initial loading direction.

19. The method of claim 17, wherein decoupling includes determining one of:
- a first state in which the second rotational speed is greater than the output rotational speed, and the second input shaft and the output shaft are both rotationally decelerating; and
- a third state in which the second rotational speed is less than the output rotational speed, and the second input shaft and the output shaft are both rotationally decelerating.

20. The method of claim 17, wherein mating includes moving the synchronizer towards the predicted gear along the second input shaft as the synchronizer and the predicted gear decelerate at different magnitudes in the same direction.

* * * * *